United States Patent [19]

Struger

[11] 3,751,684
[45] Aug. 7, 1973

[54] FAULT MODE DETECTION SYSTEM
[75] Inventor: Odo J. Struger, Mayfield Heights, Ohio
[73] Assignee: Allen-Bradley Company, Milwaukee, Wis.
[22] Filed: Apr. 14, 1972
[21] Appl. No.: 244,153

[52] U.S. Cl............... 307/202, 307/214, 307/215, 307/217, 307/218, 307/241
[51] Int. Cl.... H03k 19/38, H03k 17/60, H02h 7/20
[58] Field of Search.................. 307/202, 209, 213, 307/214, 215, 217, 218, 241, 242, 243; 317/33 R, 31, 46; 328/7

[56] References Cited
UNITED STATES PATENTS

| 3,163,829 | 12/1964 | Ladd, Jr. | 307/202 X |
| 3,343,037 | 9/1967 | Kutz | 307/202 X |
| 3,577,006 | 5/1971 | Tyrrell et al. | 307/243 X |
| 3,599,042 | 8/1971 | Andrews, Jr. | 307/202 X |

FOREIGN PATENTS OR APPLICATIONS
1,219,262  1/1971  Great Britain.................... 307/202

OTHER PUBLICATIONS
Saia, "Protection and Failure Detection Circuit", IBM Tech. Dis. Bull., Vol. 13, No. 9, p. 2765-2766, 2/1971.

Primary Examiner—John W. Huckert
Assistant Examiner—L. N. Anagnos
Attorney—Barry E. Sammons et al.

[57] ABSTRACT

A converter circuit which includes at least one fault mode logic gate connects to receive the digital input signals generated to a two-state logic control circuit from a plurality of input devices. The converter circuit output connects through a disable bus to an output circuit bank. The converter circuit detects open circuit conditions at any one of the input devices and generates a digital disable signal to the output circuit bank which operates to disconnect, or deenergize the output devices being controlled by the logic control circuit. Input circuits may be connected between the input devices and the converter circuit to provide a hardware reduction. Also, a maintenance data indicator circuit connects to the converter circuit and operates in response to digital malfunction signals generated thereby to identify any input device which becomes open circuited.

11 Claims, 9 Drawing Figures

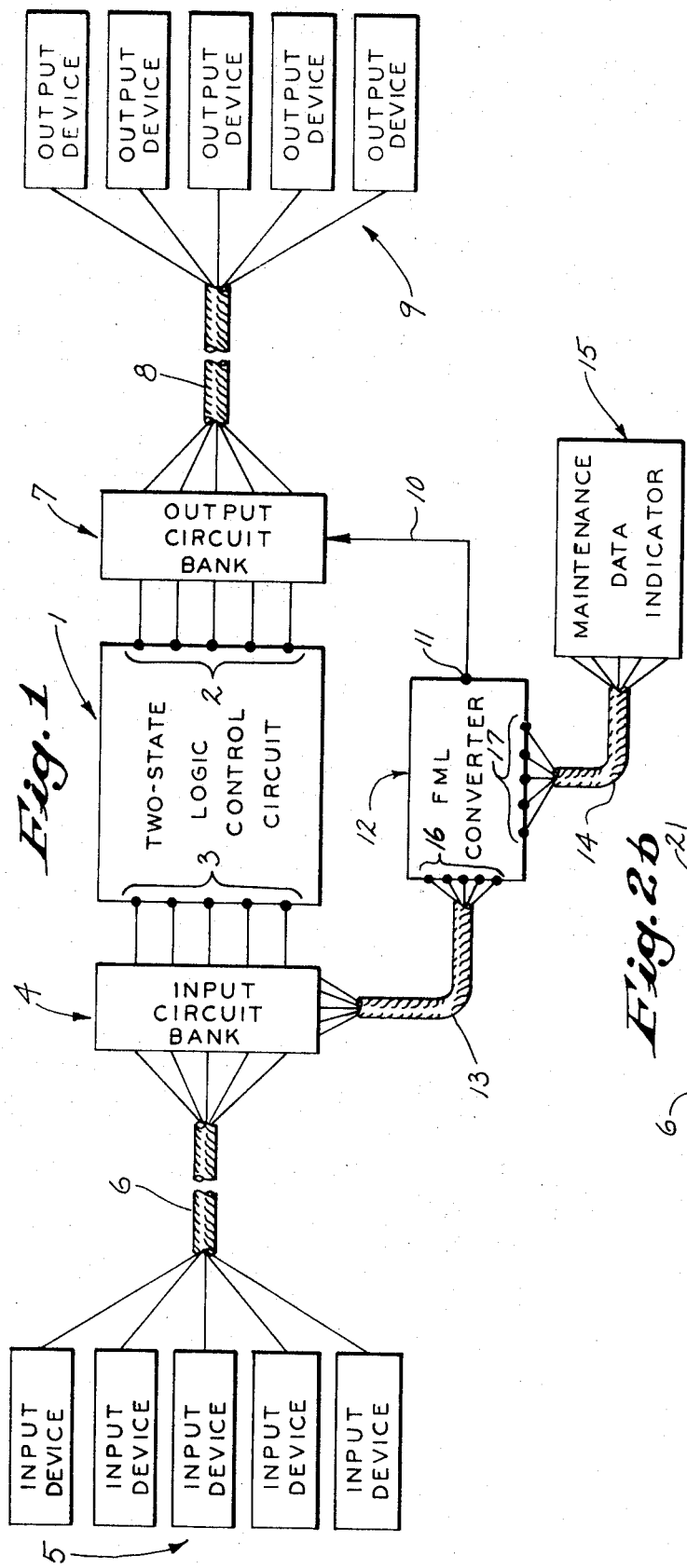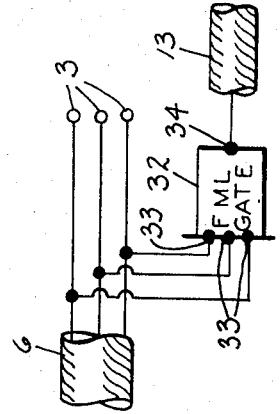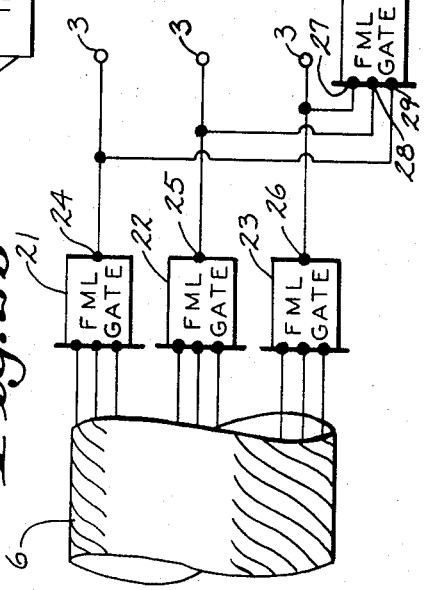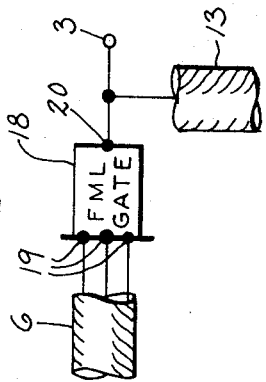

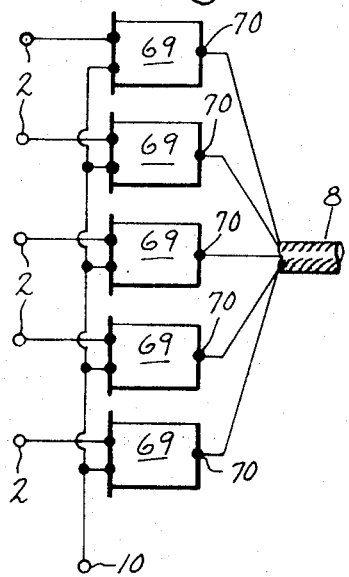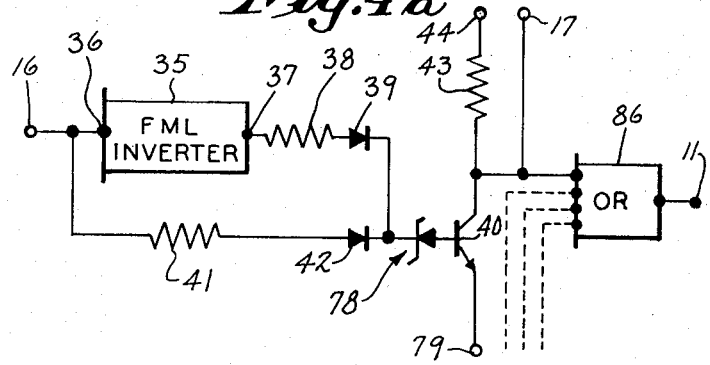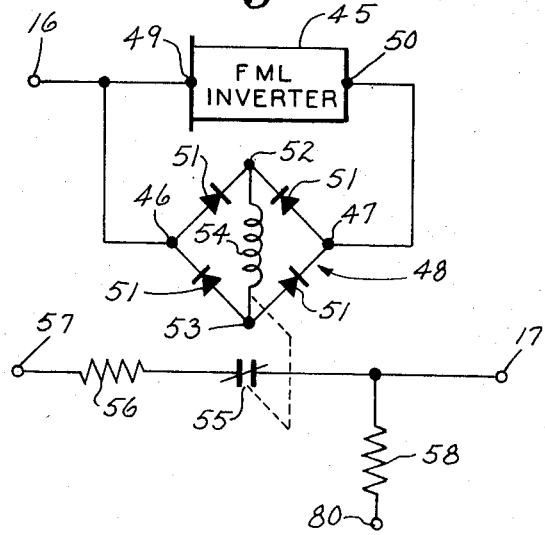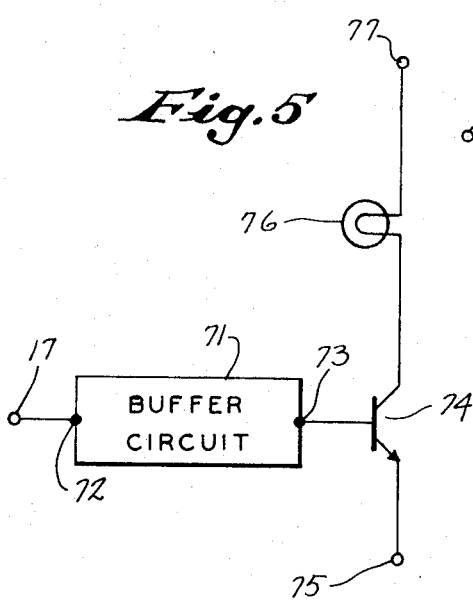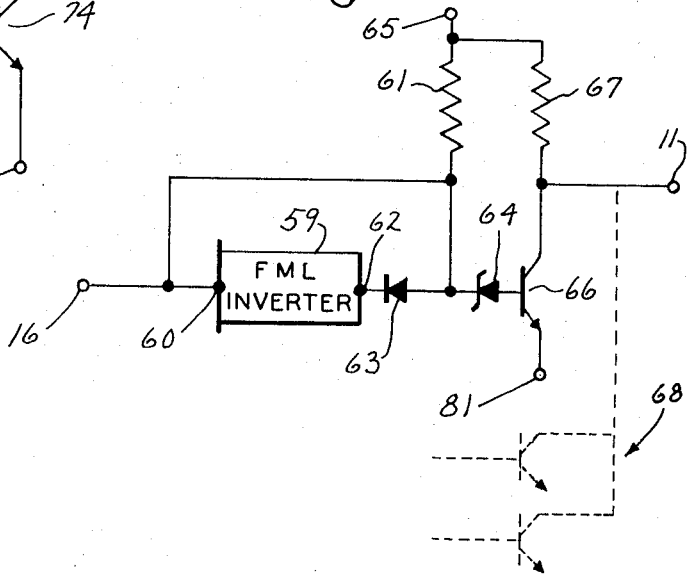

3,751,684

FAULT MODE DETECTION SYSTEM

BACKGROUND OF THE INVENTION

The field of the invention is control systems, and particularly electronic digital control systems used in combination with industrial equipment.

In the automation of industrial equipment such as punch presses, assembly lines, transfer lines, and machine tools, output devices such as motors, solenoids and relays are connected to and controlled by electronic digital control systems. Input devices such as photo electric cells, limit switches and push buttons are located on the controlled equipment and connect to the input of the digital control system to provide the information necessary to operate the equipment. Such automated systems include interlock devices and safety devices which provide input information that prevents damage to the equipment.

As disclosed in my copending U.S. patent application Ser. No. 151,674 and entitled "Fault Detecting and Fault Propagating Logic Gate", operator safety and machine protection are of major concern in the design of digital control systems. The standard digital control circuit directs the controlled equipment through a sequence of operations in response to two-state digital signals received at its inputs. Proper operation of the equipment is predicated on the assumption that the received digital input signals are either a logic high voltage or a logic low voltage. Therefore, when an open circuit occurs at a control circuit input, present digital control circuits will interpret this condition as either a logic high or a logic low, depending on the type of logic gates used at their input. If such an open circuit condition occurs at an input device which is connected to sense dangerous situations, the control system must properly interpret this condition and shut down the controlled machinery.

In the above cited copending application, I disclosed a new fault mode logic gate which is responsive not only to logic high and logic low input signals, but which is also responsive to a fault indicate signal, which may be an open circuit condition. The fault indicate signal is propagated to the gate's output terminal and hence through subsequent gates to the output of the control circuit. As a result, the controlled machinery is deenergized whenever an open circuit or other faulty condition is present at an input terminal of a control circuit manufactured with these fault mode logic (FML) gates. One limitation on the application of this concept to existing systems, however, is the expense required to replace all of the two-state logic gates in a control system, with FML gates. Where the existing control system contains a large number of conventional two-state logic gates, the cost of conversion becomes prohibitive and other means for protecting equipment must be provided.

SUMMARY OF THE INVENTION

The present invention includes a fault detection system which is added to a conventional two-state logic control circuit to both sense fault conditions at its input terminals and in response thereto, disconnect the equipment, or output devices which it controls. More specifically, the invention includes a fault mode logic converter having a lead connected to each input terminal of the two-state control circuit and an output terminal connected to a disable bus. The converter output terminal assumes a first logic state when no fault, or open circuit conditions are present at the inputs to the control circuit. However, when a fault occurs, the converter responds to generate a second logic state, or disable signal, at its output. The disable bus connects to an output circuit bank which operates to disconnect the controlled equipment from the two-state logic control circuit when the disable signal is generated by the converter. The existing two-state logic control circuit need not be modified by the extensive substitution of FML gates, but instead, the fault detection system is connected thereto to provide a fault sensing and fault propagating mode of operation.

A general object of the invention is to provide a relatively inexpensive and practical means of modifying conventional logic circuits to provide a fault sensing and fault propagating capability. The converter requires minimal hardware including at least one fault mode logic gate. The number of FML gates required in the converter is determined primarily by the number of input devices connected to the input of the logic control circuit.

Another object of the invention is to provide a means of sensing and identifying faults at the inputs to a logic control circuit and propagating that information to data processing equipment. Each FML gate in the converter controls an electronic switch such as a transistor. The electronic switch provides a two-state digital output signal that indicates the condition of one or more input devices. By attaching these outputs to a properly programmed computer, or to a display panel, the condition of the various input devices can be monitored by maintenance personnel. This feature substantially reduces the time and cost of trouble shooting malfunctions which may occur in a complex system.

Still another object of the invention is to provide an inexpensive converter for transforming a fault mode digital logic signal into a conventional two-state digital signal. The output of the converter assumes one of two logic states, one of which states indicates that a fault, or open circuit condition exists at the input to the converter.

Other objects and advantages of the invention will become apparent from the description to follow. In the description reference is made to the accompanying drawings which form a part hereof, and in which there is shown by way of illustration a number of embodiments of the invention. Such embodiments do not necessarily represent the scope of the invention, and reference is made to the claims herein for interpreting the breadth of the invention.

BRIEF DESCRIPTION OF THE DRAWINGS

FIG. 1 is an electrical block diagram of a preferred embodiment of the invented fault detection system applied to a control system, FIGS. 2a, 2b and 2c are electrical schematic diagrams of three alternative input circuits which may be used in the system of FIG. 1, FIG. 3 is an electrical schematic diagram of an output circuit which may be used in the system of FIG. 1, FIGS. 4a, 4b and 4c are electrical schematic diagrams of three alternative converters which may be used in the system of FIG. 1, and FIG. 5 is an electrical schematic diagram of a maintenance data indicator circuit which forms a part of the system of FIG. 1.

DESCRIPTION OF THE PREFERRED EMBODIMENT

Referring to FIG. 1, an electronic digital control system includes a two-state logic control circuit 1 to which the invented fault detection system is added. The logic control circuit 1 is comprised of conventional two-state logic gates which are connected together to control the logic state at each of its output terminals 2 in accordance with the logic state of the digital signals applied to each of its input terminals 3. The control circuit 1 may, for example, be connected to receive logic signals from a plurality of input devices 5 which are attached to indicate the position of a part moving along an assembly line. In response to these received digital signals, the logic control circuit 1 generates a digital signal at each of its output terminals 2 which signals function to sequentially energize and deenergize output devices 9 and thereby transfer and work the part being manufactured. The invented fault detection system is connected to the control system to improve its performance. The control system includes the two-state logic control circuit 1, its connection to a set of input devices 5 through a cable 6, and its connection to a set of controlled output devices 9 through a cable 8. In the description to follow, a general disclosure of the fault detection system will be discussed first, followed by a more specific disclosure of each system element.

The fault detection system connects to the two-state logic control circuit 1 and includes an input circuit bank 4 which connects to the control circuit input terminals 3. Regardless of its form, the input circuit bank 4 is adapted to sense the state of each input device 5, that is, whether each input device 5 is generating a logic high voltage, a logic low voltage, or a fault condition. As discussed above, a general object of the invention is to disconnect, or deenergize, the controlled output devices 9 when a fault condition is sensed at an input terminal 3. Accordingly, an output circuit bank 7 is connected to the output terminals 2 of the logic control circuit 1 and to a disable bus 10. When a disable signal is applied to the disable bus 10, the output circuit bank 7 operates to disconnect the cable 8 from the control circuit output terminals 2. As used herein, the term "disconnect" means the shutting down or deactivation of the controlled devices 9 such that they cannot cause damage to the machine or operator. The disable signal is a conventional digital signal and may be either a logic high voltage or a logic low voltage depending on the particular hardware selected.

The disable bus 10 connects to an output terminal 11 on a fault mode logic converter 12. The converter 12 has a set of input terminals 16 connected to the input circuit bank 4 through a cable 13, and whenever an open circuit condition occurs in one or more of the input devices 5, a fault indicate signal is generated through the cable 13 to the converter 12. The fault mode logic converter 12 operates in response to such a received fault indicate signal to generate a disable signal on the disable bus 10, and to thereby operate the output circuit bank 7 to disconnect the output devices 9. The fault indicate signal is an open circuit, that is, it is neither a current source nor a current sink to the input of the converter 12. However, it may assume a voltage intermediate the logic high and logic low voltages of the system.

An additional feature of the fault detection system is its ability to identify a faulty input device. To indicate this information a maintenance data bus 14 connects to a set of data terminals 17 on the converter 12 and to a maintenance data indicator 15. When a fault condition occurs at one of the input devices 5, it is sensed by the input circuit bank 4 and a fault indicate signal is generated to the converter 12. This signal is transformed by the fault mode logic converter 12 to a digital malfunction signal which appears at one of the data output terminals 17. The maintenance data indicator 15 is, for example, a computer which has been programmed to examine each data output terminal 17 for the presence of the malfunction signal. Each data output terminal 17 corresponds to an input device 5 or a group of input devices 5, and the computer provides a visual printout of the condition of each.

The maintenance data indicator 15 may also be a set of lights which are connected to be selectively energized in response to the malfunction signals which appear at the data terminals 17. Such a maintenance data indicator 15 is shown in FIG. 5, wherein a single data output terminal 17 is monitored. It should be apparent that where there are additional data output terminals 17, the circuit of FIG. 5 is repeated for each. The maintenance data indicator circuit includes a buffer circuit 71 which has an input terminal 72 connected to the data terminal 17 and an output terminal 73 which is connected to the base of a switching transistor 74. The emitter transistor 74 connects to a negative voltage terminal 75 and its collector connects through a light bulb 76 to a positive voltage terminal 77. The malfunction signal is a conventional digital signal which may be either a logic high or logic low voltage, and when it is generated at the data terminal 17, a current is generated by the buffer circuit 71 to the base of transistor 74. The transistor 74 is turned on and the light bulb 76 is thus energized to visually indicate the source of the trouble.

The above discussion outlines the general elements of the fault detection system. These elements include the input circuit bank 4, the fault mode logic converter 12, and the output circuit bank 7. These may take various specific forms, and in some instances variations in one element can be made independently of the other elements. In most instances, however, the choice of a particular circuit for one of the elements, such as the fault mode logic converter 12, will influence the particular circuit chosen for each of the remaining elements.

Referring to FIGS. 2a, 2b and 2c, three alternative input circuits are shown, one or more of which are used to form the input circuit bank 4, the number depending primarily upon the number of input devices 5 being monitored. For example, the input circuit shown in FIG. 2a is comprised solely of an FML gate 18 having three input terminals 19 connected to the cable 6, and an output terminal 20 connected to both a logic circuit input terminal 3 and a lead in the cable 13. It will, therefore, monitor three input devices 5. As discussed in the above cited copending application, the FML gate 18 not only operates to generate a logic high or logic low voltage at its output terminal 20 in accordance with the logic state of its input terminals 19, but it also propagates to its output terminal 20 any open circuit which occurs at one or more of its input terminals 19. Such an open circuit condition is a fault indicate signal which is conveyed through the cable 13 to the FML converter 12. It is also conveyed to an input terminal 3 on the logic control circuit 1, but the two-state logic gates used in the control circuit 1 do not recognize its significance.

It should be noted that the FML logic gate 18 is effectively part of the logic control circuit 1 as well as being a part of the fault detection system. That is, the gate 18 performs a logical operation in accordance with the digital signals applied to its input terminals 19. The FML gate 18 may perform any of the conventional functions such as AND, NAND, OR, NOR, etc., and it is substituted for the conventional two-state logic gate otherwise located at the input to the digital control circuit 1. Also note, however, that when a fault indicate signal is generated by the FML gate 18, it indicates an open circuit at any one of three input devices 5. As will become apparent when discussing the converter 12, this three-to-one reduction allows considerable savings in hardware, however, maintenance information which exactly identifies the faulty input device is not conveyed to the FML converter 12 when this embodiment is used.

Referring to FIG. 2b, a second input circuit is shown which provides a further reduction in system hardware. With this embodiment three FML logic gates 21, 22 and 23 each have their three input terminals connected to a lead cable 6. Their respective output terminals, 24, 25 and 26, connect to both control circuit input terminals 3, and to respective input terminals 27, 28 and 29 on a fourth FML gate 30. An output terminal 31 on the fourth FML gate 30 connects to a lead in the cable 13. As with the first embodiment shown in FIG. 2a, this second embodiment also includes FML gates which function in both the digital control system and the fault detection system. The three FML gates 21, 22 and 23 propagate open circuit conditions from any of nine input devices 5 to the fourth FML gate 30, which in turn generates a fault indicate signal to the converter 12. A nine-to-one reduction is thus obtained resulting in considerable reduction in hardware. It should be apparent to those skilled in the art that additional reductions can be obtained by further pyramiding FML gates. It should be recalled, however, that with each additional reduction, more maintenance, or troubleshooting information is lost.

Referring to FIG. 2c, a third input circuit is shown in which the leads of the cable 6 are connected directly to the input terminals 3 of the logic control circuit 1. An FML gate 32 has three input terminals 33, each of which is connected to an input terminal 3 of thz logic control circuit 1. An output terminal 34 on the FML gate 32 connects to a lead in the cable 13. This embodiment is particularly advantageous when adapting existing digital control systems using high threshold or current sourcing type logic gates with the fault detection system. It does not require the substitution of FML logic gates for the two-state logic gates at the input of the control circuit 1. Each input terminal 33 of the FML gate 32 is connected to a lead in the cable 6 to sense an open circuit condition thereon. The FML gate 32 provides a three-to-one reduction as in the first embodiment of FIG. 2a, and it should be apparent that where additional reduction is desired for a large number of input devices 5, additional FML gates can be pyramided as is done in the second embodiment shown in FIG. 2b. Also, it should be apparent that where no reduction is needed, a direct connection of each input device 5 to the cable 13 can be made. In other words, in its simplest form, the input circuit bank 4 may be merely a series of connection points between the leads in the cable 13 and the leads in the cable 6.

Referring to FIGS. 4a, 4b and 4c, three alternative embodiments of the fault mode logic converter circuit 12 are shown. Each is adapted to receive a fault indicate signal from one lead in the cable 13 and in response thereto, generate a digital signal which is compatible with standard two-state logic gates. Where the cable 13 includes more than one lead, a plurality of converter circuits such as those shown in FIGS. 4a, 4b and 4c are required — one for each lead in the cable 13.

Referring to FIG. 4a, the converter circuit shown includes an FML inverter gate 35 having an input terminal 36 connected to a lead in the cable 13 and an output terminal 37 connected to one lead of a first coupling resistor 38. The other lead of the coupling resistor 38 connects through a first blocking diode 39 and a zener diode 78 to the base of an NPN transistor 40. The input terminal 36 on the FML inverter gate 35 also connects through a second coupling resistor 41, a second blocking diode 42, and the zener diode 78 to the base of the transistor 40. The emitter of the NPN transistor 40 connects to a negative d-c supply terminal 79, and its collector connects through a load resistor 43 to a positive d-c supply terminal 44.

The FML gate 35 inverts a digital signal applied to its input terminal 36, and propagates an open circuit condition appearing at its input terminal 36. When a logic high voltage is applied to the input terminal 16 of the converter 12, current flows through the second coupling resistor 41, the second blocking diode 42, and the zener diode 78 to the base of the NPN transistor 40. The base-emitter junction of the transistor 40 becomes forward biased and the transistor 40 turns on, driving its collector voltage to a logic low state. On the other hand, when a logic low voltage is applied to the input terminal 16, the FML inverter gate 35 generates a logic high voltage at its output terminal 37. Current is thus conducted through the first coupling resistor 38, first blocking diode 39, and zener diode 78 to drive the NPN transistor 40 into conduction. In summary, if either a logic high voltage or a logic low voltage is applied to the input terminal 16, a logic low voltage is generated at the collector of the NPN transistor 40. If a fault indicate signal is applied to the input terminal 16 of the converter circuit, however, no current is generated to the base of the NPN transistor 40 and as a result it turns off. When this occurs, its collector rises to a logic high voltage level. The NPN transistor 40, therefore, operates essentially as an electronic switch to connect either the logic high voltage or the logic low voltage to the converter output terminal.

If there is one lead in the cable 13, only one converter circuit as shown in FIG. 4a is required and the collector of the NPN transistor 40 forms both a data terminal 17 and the output terminal 11 of the FML converter 12. If, however, there are a plurality of leads in the cable 13 and consequently a plurality of input terminals 16, a corresponding number of converter circuits are required. In such a case, a conventional two-state OR gate 86 is connected to the output of each converter circuit. The OR gate 86 has a plurality of input terminals, one connected to the transistor 40 in each converter circuit. The output terminal of the OR gate then forms the output terminal 11 of the FML converter 12. The collectors of the NPN transistors 40 then each form a data terminal 17.

Referring to FIG. 4b, a second embodiment of the converter circuit is shown in which an FML inverter gate 45 is connected across input terminals 46 and 47 of a full-wave bridge rectifier 48. Specifically, an input terminal 49 on the FML inverter gate 45 connects to the bridge rectifier input terminal 46 and to one of the converter input terminals 16. An output terminal 50 on the FML inverter gate 45 connects to the bridge rectifier input terminal 47. The full-wave bridge rectifier circuit 48 is a conventional circuit comprised of four diodes 51 connected in a loop to form the two input terminals 46 and 47 and a pair of output terminals 52 and 53. A relay coil 54 is connected across the bridge rectifier output terminals 52 and 53 and is magnetically linked to operate normally closed contacts 55. One lead of the contacts 55 connects through a first coupling resistor 56 to a positive d-c supply terminal 57, and a second lead connects through a second coupling resistor 58 to a negative d-c supply terminal 80. The connection between the contacts 55 and the second coupling resistor 58 is a data terminal 17, and if only one converter circuit is required, it also serves as the FML converter output terminal 11.

When a logic high voltage is applied to the input terminal 16 of the circuit shown in FIG. 4b, current flows into the bridge rectifier circuit 48, through its input terminal 46, through the relay coil 54, out the terminal 47, and through the FML inverter output terminal 50 which is at a logic low voltage state. Thus, the relay coil 54 is energized and the normally closed contacts 55 are open. The data terminal 17 is thereby driven to a logic low voltage. Likewise, if a logic low voltage is applied to the input terminal 16, a logic high voltage is generated at the FML inverter output terminal 50, and current flows into the bridge rectifier circuit 48 in the reverse direction to energize the relay coil 54 and drive the data terminal 17 to a logic low voltage. On the other hand, when a fault indicate signal is applied to the input terminal 16, no current is generated into either bridge rectifier input terminal 46 or 47 and the contacts 55 remain closed. As a result, a logic high voltage is applied to the data terminal 17 through the first coupling resistor 56.

It should be apparent from the above description that the contacts 55 may be connected in many ways to generate a disable signal to the output circuit bank 7. In addition, however, the contacts 55 may themselves be connected to the output of the logic control circuit 1. In such a case the contacts 55 effectively become the output circuit bank 7 inasmuch as they operate in response to a disable signal generated by the converter 12 to disconnect an output device 9 from the control circuit 1. In such an arrangement, normally open contacts must be used, and separate contacts are provided for each output device 9 that is to be controlled.

Referring to FIG. 4c, a third embodiment of the converter includes an FML inverter gate 59 having an input terminal 60 connected to both one lead of a first load resistor 61 and a converter input terminal 16. An output terminal 62 on the FML inverter gate 59 connects through a coupling diode 63 to both the first load resistor 61 and the cathode of a zener diode 64. The other lead of the first load resistor 61 connects to a positive d-c supply terminal 65. The anode of the zener diode 64 connects to the base of an NPN transistor 66, the emitter of which is connected to a negative d-c supply terminal 81, and the collector of which is connected through a second load resistor 67 to the supply terminals 65. Other converter circuits identical to this one may also be included in the FML converter 12, each connected to a separate lead in the cable 13. As indicated by the phantom lines 68 the transistor collectors of each of these additional converter circuits are connected together and connected to the FML converter output terminal 11.

When a logic high voltage is applied to the input terminal 16 of the converter circuit of FIG. 4c, a logic low voltage is generated at the FML gate output terminal 62. This logic low voltage diverts current flowing through the first load resistor 61 away from the base of the NPN transistor 66 causing the transistor 66 to turn off. Likewise, when a logic low voltage is applied to the input terminal 16, current flowing through the first load resistor 61 is diverted from the base of the transistor 66 by the low voltage at the input terminal 16. Coupling diode 63 prevents current flow from the gate output terminal 62 when a logic low is applied to input terminal 16. Thus when a logic high or a logic low voltage is applied to the input terminal 16, the NPN transistor 66 is driven to its non-conductive state and the FML converter output terminal 11 is held at a logic high voltage by the voltage applied through the second load resistor 67. When a fault indicate signal is applied to the input terminal 16, however, both the input terminal 60 and output terminal 62 of the FML inverter gate 59 effectively become open circuited. As a result, a voltage is applied through the first load resistor 61 to the cathode of the zener diode 64 which breaks down and allows current to flow into the base of the NPN transistor 66. Consequently, the fault indicate signal allows the current source to drive the NPN transistor 66 into saturation and thus drops the voltage at the FML converter output terminal 11 to a logic low state. It should be apparent that if a fault indicate signal is applied to any one of the input terminals 16 of an FML converter 12 using this circuit, that the converter output terminal 11 will be driven to a logic low voltage as well as all the attached transistor collectors. That is, when combined with other similar circuits to form the FML converter 12, this third embodiment of the converter circuit includes the OR gate (known in the art as collector ORing) as an integral part. However, it should be noted that when the converter circuit of FIG. 4c is used, there is no provision for separate data terminals 17. The troubleshooting features of the present invention are, therefore, almost completely lost when the third embodiment of the converter circuit of FIG. 4c is used.

Referring to FIG. 3, the output circuit bank 7 is comprised of a plurality of conventional two-state logic gates 69, one for each output terminal 2 on the logic control circuit 1. When used in conjunction with the third embodiment of the converter circuit shown in FIG. 4c, the logic gates 69 are AND gates, and when used with the first embodiment of the converter circuit shown in FIG. 4a, they are NAND gates. The operation of these gates is well known to those skilled in the art. Each logic gate 69 has a pair of input terminals, one of which is connected to the disable bus 10 and the other of which is connected to an output terminal 2 on the logic control circuit 1. Each logic gate 69 also has an output terminal 70 which connects to a lead in the cable 8 and is responsive to the logic state of its input terminals. When a first logic state is applied to the disable bus 10, the gates 69 operate to conduct the digital signals at the control circuit output terminals 2 to the cable 8 and hence to the output devices 9. When a second logic state is applied to the disable bus 10, herein referred to as a disable signal, the output terminals 70 on each gate 69 are driven to and held in a specific logic state. As a result, the digital output signals of the control circuit 1 are effectively disconnected from the cable 8. It should be apparent to those skilled in the art that numerous modifications can be made to the output circuit bank 7 to provide the disconnection function. For example, instead of adding the gates 69 to the logic control circuit 1, existing two-state logic gates in the circuit 1 may be used. Or, mechanical contacts such as the contacts 55 discussed above in connection with the converter circuit of FIG. 4b may be connected to the output terminals 2.

I claim:

1. In a control circuit connected to receive a logic input signal from an input device and connected to generate an output signal to an output device, a fault detection system the combination comprising:
    an FML converter including a converter circuit having an input terminal connected to receive said logic input signal and an output terminal connected to a disable bus, said FML converter being responsive to generate a first logic state at its output terminal when said logic input signal is in a logic state, and being responsive to generate a second logic state at its output terminal when said logic input signal is in a fault condition; and
    an output circuit connected in circuit between said control circuit and said output device, and connected to said disable bus, said output circuit being responsive to the second logic state generated at said converter output terminal to disconnect said output device from said control circuit.

2. The fault detection system as recited in claim 1 in which there are a plurality of input devices and said system includes a fault mode logic gate having an output terminal connected to the input terminal of said FML converter and a plurality of input terminals each connected to an input device;
    wherein said fault mode logic gate generates a fault indicate signal to said FML converter when one or more of the input devices attached to its input terminals becomes open circuited.

3. The fault detection system as recited in claim 1 wherein there are a plurality of output devices and a corresponding number of output circuits, each output circuit being connected to an output device and each being connected to said disable bus to disconnect its associated output device from said control circuit when said second logic state is generated on said disable bus.

4. The fault detection system as recited in claim 1 in which there are a plurality of input devices and said FML converter is comprised of a plurality of converter circuits, each converter circuit having an input terminal connected to receive the logic input signal from one or more of said input devices and each being operable to generate said second logic state on said disable bus when a fault indicate condition is received.

5. The fault detection system as recited in claim 4 in which said FML converter includes an OR gate and the output terminal of each converter circuit connects to an input terminal on said OR gate and an output terminal on said OR gate connects to said disable bus.

6. The fault detection system as recited in claim 5 in which there are a plurality of maintenance data indicator circuits and the output terminal of each converter circuit is connected to the input of one of said maintenance data indicator circuits, and each maintenance indicator circuit is responsive to said second logic state to indicate and identify an open circuited input device.

7. The fault detection system as recited in claim 6 wherein each maintenance indicator circuit includes an illuminating device which is energized when said second logic state is generated by the converter circuit to which it is connected.

8. An FML converter circuit, the combination comprising:
    an FML inverter gate having an input terminal and an output terminal;
    a first blocking diode having one lead connected to said gate input terminal;
    a second blocking diode having one lead connected to said gate output terminal;
    an electronic switch which has a control element connected to the other lead of each of said blocking diodes and a pair of current carrying elements;
    a first logic state voltage source connected to one of said current carrying elements;
    a second logic state voltage source; and
    a load resistor connecting said second logic state voltage source to said other current carrying element and to a circuit output terminal;
    wherein said electronic switch operates to connect one of said logic state voltage sources to said circuit output terminal when a digital signal is applied to said FML inverter gate input terminal, and to connect said other logic state voltage source to said circuit output terminal when a fault indicate signal is applied to said FML gate input terminal.

9. The FML converter circuit as recited in claim 8, wherein said electronic switch is a transistor.

10. An FML converter comprised of a plurality of substantially identical converter circuits, each converter circuit having an input terminal and each converter circuit having an output terminal connected to both a common converter output terminal and to a load resistor which connects with a first logic state voltage source, each converter circuit comprising:
    an FML inverter gate having an output terminal and an input terminal connected to the converter circuit input;
    a current source connected to one terminal of said FML inverter gate;
    a blocking diode having one lead connected to said current source and another lead connected to the other terminal of said FML inverter gate; and
    an electronic switch having a control element connected to said current source, a first current carrying element connected to said common converter output terminal, and a second current carrying element connected to a second logic state voltage source;
    wherein said electronic switch is operable to connect said second logic state voltage source to said common converter output terminal when a fault indicate signal is applied to the converter circuit input terminal.

11. The FML converter as recited in claim 10 wherein said electronic switch is a transistor and a zener diode is connected between its control element and the current source.

* * * * *